Nov. 13, 1962 E. J. SCHUBERT 3,064,237

CHANNEL SELECTOR

Filed April 30, 1958 2 Sheets-Sheet 1

WITNESSES:

Bernard R. Giegucy

Robert C. Baird

INVENTOR

Ernest J. Schubert

BY

George C. Thompson, Jr.

ATTORNEY

Nov. 13, 1962

E. J. SCHUBERT 3,064,237

CHANNEL SELECTOR

Filed April 30, 1958

2 Sheets-Sheet 2

United States Patent Office 3,064,237

Patented Nov. 13, 1962

3,064,237
CHANNEL SELECTOR

Ernest J. Schubert, Berwyn, Pa., assignor to Westinghouse Electric Corporation, East Pittsburgh, Pa., a corporation of Pennsylvania Filed Apr. 30, 1958, Ser. No. 732,056

1 Claim. (Cl. 340—166)

This invention relates to a dial controlled channel selector and more particularly to a channel selector not using movable contacts of a relay.

One method previously employed for selecting channels has been the use of relays or stepping switches reading the individual digits of a pulse train and stepping off the number of digits or steps in a pulse code received over the dial controlled line.

It is, therefore, an object of this invention to provide a channel selection device capable of making selections without the use of stepping switches or relays.

It is another object of this invention to provide a binary decimal to binary converting unit for channel selection of the desired channel.

It is another object of this invention to provide an economical compact static network capable of performing the function of stepping switches.

Other objects, purposes and characteristic features will become obvious as the description of the invention progresses.

In practicing this invention, a decimal dialing received over an input line to the channel selector is fed into a decimal binary converter to convert the pulses into a binary number, the binary combination of which is capable of selecting or energizing a single channel in a switching matrix. The selection of the channel is then held through a control unit until the termination of a message being carried on the channel.

In each of the several views, similar parts bear like reference characters.

Figure 1:
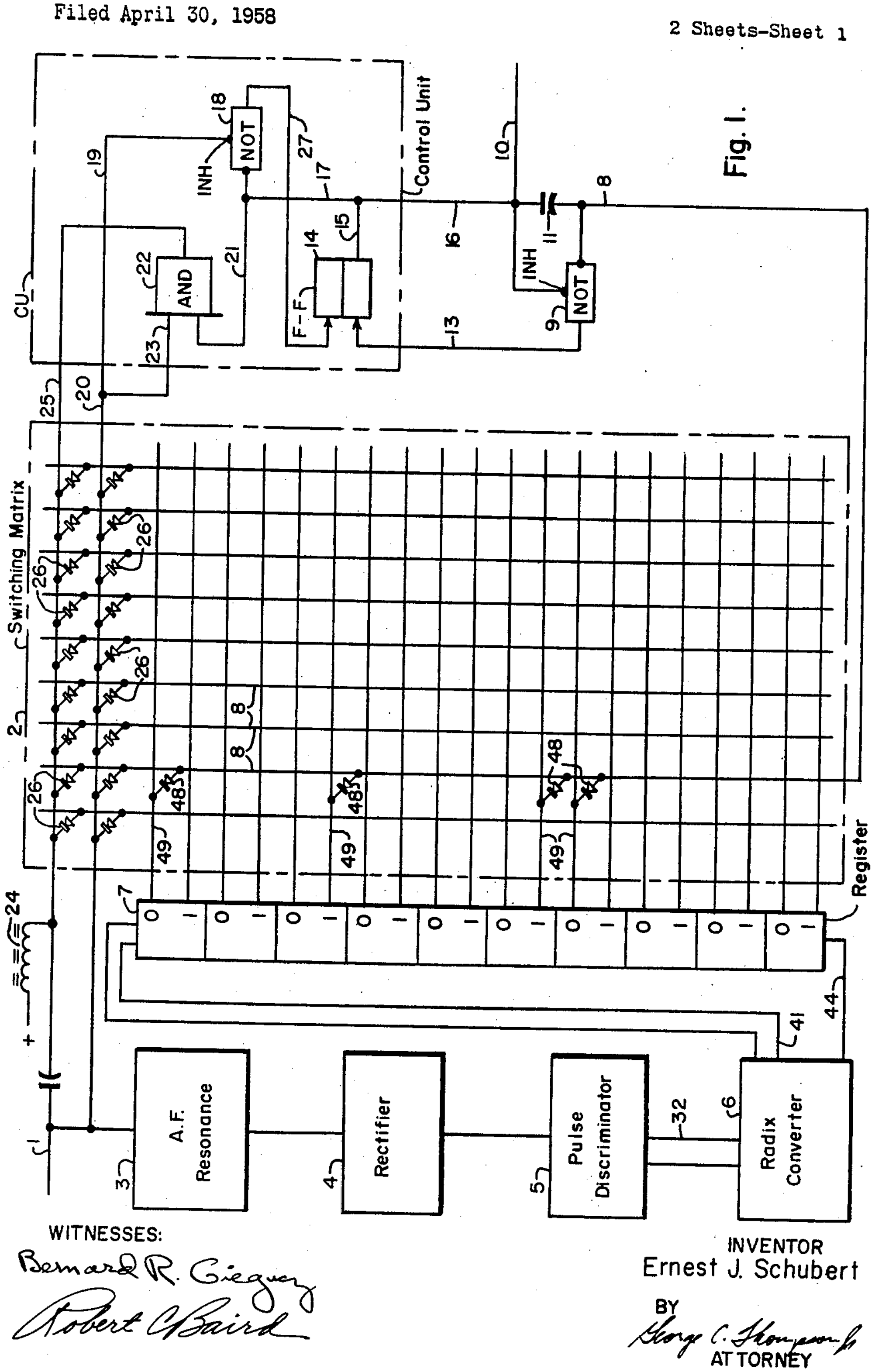
FIGURE 1 is a diagrammatic view of the channel selector of this invention.

The circuit of FIG. 1 is a channel selector circuit normally used with pulse modulated carrier and therefore is provided with a demodulating and pulse discriminating circuit that would not be necessary with a system not using a carrier frequency. A signal received on the input line 1 is applied to the A.F. resonance device 3, fed into the rectifier 4 and then into the pulse discriminator 5. The pulse discriminator 5 delivers its output into the radix converter 6 (to be explained hereinafter) which converts the binary decimal information into binary information for use in the address shift register 7. The shift register 7 then selects one of a plurality of channels 8 in the diode switching matrix 2. The selection of channel 8 is made through the combination of "ones" and "zeroes" in the register 7. The input signal on line 1 is also applied to the hold line 20 to hold the selected channel 8 as explained hereinafter.

The selected channel 8 then causes an associated sense inhibitor 9 to become active so long as the receiver channel 10 has no energy applied thereto. The inhibitor 9 is commonly called a NOT unit and as long as the receiver channel 10 contains energy the NOT unit 9 cannot be conditioned to provide an output. If we assume that the receiver channel 10 is not active at this time, then an output would occur from the NOT unit 9 onto the conductor 13 to the control unit CU. The output conductor 13 causes the flip-flop 14 to produce an output on its conductor 15 which is fed over the conductor 16 to the channel 10 for providing a D.C. supply to the channel 10 for control of the receiving unit. At the same time, the energy is applied by the conductor 17 from the flip-flop 14 to the inhibtor or NOT unit 18. At this time, the NOT unit 18 is receiving energy over the conductor 19 from the hold line 20 which is active at this time because of the signal input on the conductor 1. With energy applied both to the conductors 17 and 19, the NOT unit 18 is held inoperative.

The energy appearing on the conductor 17 from the flip-flop 14 also is applied to the conductor 21 to the AND gate 22. At the same time energy is applied to the AND gate over the conductor 23 connected to the hold line 20. With both input conductors active, the AND gate 22 produces an output on the interlock line 25 which acts to remove ground potential from the diodes 26 allowing positive potential to be applied through the inductor 24 and audio energy to be transmitted over the selected channel 8 to the receiving channel 10. A bypass capacitor 11 is connected between channels 8 and 10 in order to by-pass the audiofrequency past the NOT unit 9 when the channel 10 has direct current applied to it.

If we assume that the channel desired by the switching matrix as a receiving channel is busy it can be seen that the energy on the channel such as the channel 10 would prevent an output from the NOT unit 9, therefore preventing the flip-flop 14 from applying energy to the AND gate 22 for completing the operation. Under these circumstances, the interlock line cannot be energized and therefore the channel desired for operation cannot be selected but will be grounded.

If we assume, however, that the channel was selected as previously described and the message transmitted in the normal manner at this time the message is completed and the transmitting party interrupts the selected channel. It can then be seen that the energy is removed from the hold line 20 deactivating the AND gate 22 and therefore grounding the interlock line 25. At the same time, energy from the hold line 20 normally applied to the NOT unit 18 over the conductor 19 becomes removed allowing the NOT unit 18 to also become active and apply output energy on its output path 27. The output path 27 then applies the energy to the flip-flop 14 causing the flip-flop to return to its original state removing energy from the output line 15. Removal of energy from the output line 15 also allows the conductor 10 to return to an inactive state for further future selection.

Figure 2:
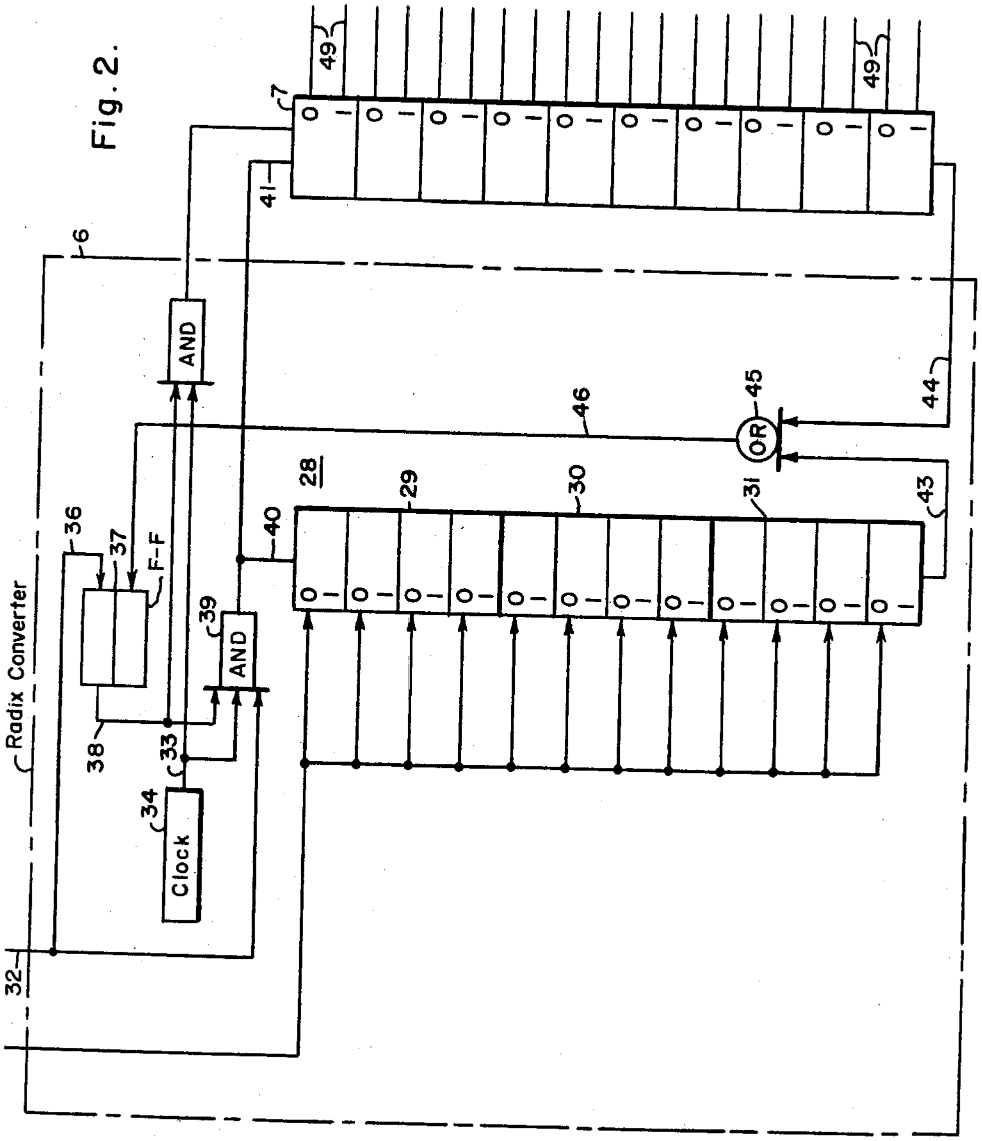
FIG. 2 is a detailed showing of the radix converter used for decimal to binary conversion in the channel selector of FIG. 1.

The radix converter necessary for converting incoming decimals expression into a binary expression as shown in FIG. 1 by the block 6, and shown in detail in FIG. 2, will now be explained. The energy applied to the conductor 1 is applied to the audiofrequency resonant circuit 3, rectifier 4 and the pulse discriminator 5 and is in the form of binary coded decimal; that is with the units in binary form, the tens in binary form, and the hundreds in binary form. The binary coded decimal energy, after being properly wave shaped by the rectifier and pulse discriminator, is applied to the radix converter 6. This energy is fed into the register 28 in parallel with the units going into the unit portion 29, the tens into the tens portion 30 and the hundreds in the hundred portion 31. Since it is desired to transform this energy into a straight binary form, it is necessary to apply energy to the decimal binary conductor 32. At the same time, clock pulses are applied over the conductor 33 through a suitable clock mechanism 34, not shown in detail since it can be of any well known type. Energy on the conductor 32 is also supplied over the conductor 36 to cause the flip-flop 37 (of any suitable well known type) to produce an output on its output conductor 38. The energy received over the conductor 32, the clock pulse received over the conductor 33 and the output energy received from the flip-flop over the conductor 38 and are applied to the AND gate 39 causing it to become active. With the AND gate 39 active, energy is supplied over its conductor 40 to the binary decimal register 28 and over the conductor 41 to the binary register 7. This output energy is in the form of clock pulses and is fed into each of the registers simultaneously until an overflow occurs from either the register 28 or the register 7 into the conductors 43 or 44, respectively. Energy application to either the conductor 43 or the conductor 44 then causes the deactivating OR unit 45 to become active to place output energy on the conductor 46 to return the flip-flop 37 to its original inactive or cut-off position for deactivating the AND gate 39.

Since the register 28 already contains input energy, the number of clock pulses necessary to cause an overflow output on the conductor 43 are the pulses necessary to fill the register from its original input level. It, therefore, can be seen that the energy applied to the register 7 in binary form would be the clock pulses, necessary to cause an overflow in the register 28. The count in the register 7 then causes certain of the flip-flops of the register to contain ones while other of the flip-flops contain zeros. This combination of ones and zeros in the register act to supply energy to suitable conductors such as the conductors 49 in the switching matrix 2 to cause certain of the diodes such as the diodes 48 of the switching matrix 2 to be ungrounded along one of the channels 8 to cause the channel to become active.

The registers 28 and 7 are digital registers of any suitable type containing a plurality of digits, represented by standard flip-flop or bistable circuits. Since these flip-flops are standard devices further description of these is felt to be unnecessary.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

A channel selector comprising a switching matrix having a plurality of outputs, input means including a shift register connected to said switching matrix for selectively actuating one of said outputs, a plurality of channels, actuating means operably connected to said plurality of outputs and said plurality of channels and responsive to first, actuation of said one of said outputs and second, deactivation of a selected one of said channels to actuate said selected one of said channels, and interlock means responsive to actuation of said selected one of said channels to maintain said one of said outputs active said interlock means responsive to interruption of the input signals to said input means for deactivating said one of said outputs.

References Cited in the file of this patent

UNITED STATES PATENTS

| | | |
|---|---|---|
| 2,033,283 | Gray | Mar. 10 1936 |
| 2,434,989 | Christian | Jan. 27, 1948 |
| 2,601,089 | Burkhart | June 17, 1952 |
| 2,624,786 | Potter | Jan. 6, 1953 |
| 2,627,039 | MacWilliams | Jan. 27, 1953 |
| 2,734,182 | Rajchman | Feb. 7, 1956 |
| 2,745,006 | Chu et al. | May 8, 1956 |
| 2,811,713 | Spencer | Oct. 29, 1957 |

OTHER REFERENCES

Proceedings of the I.R.E., February 1949, pp. 139–147, titled "Rectifier Networks for Multiposition Switching," by Brown and Rochester.